Feb. 21, 1950 R. E. SHIPLEY 2,498,051
ANIMAL HOLDER
Filed June 28, 1946
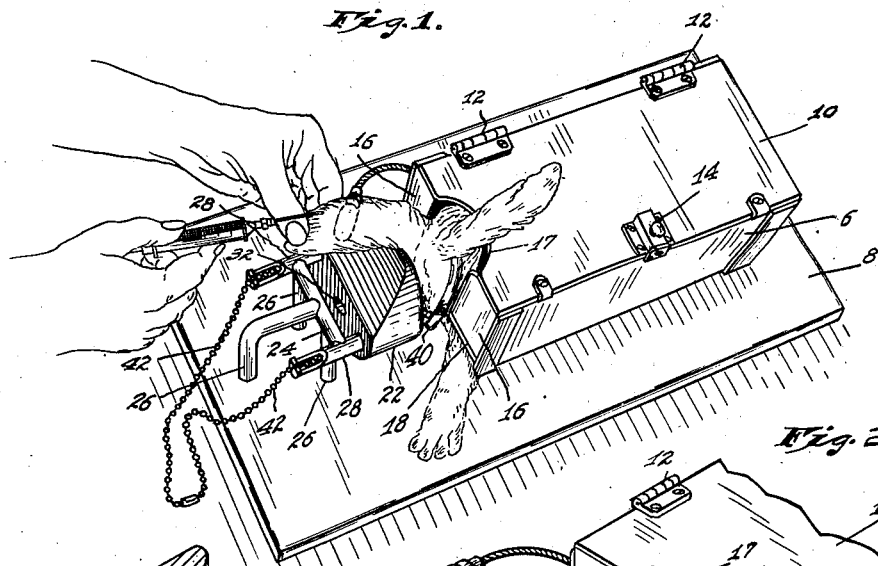
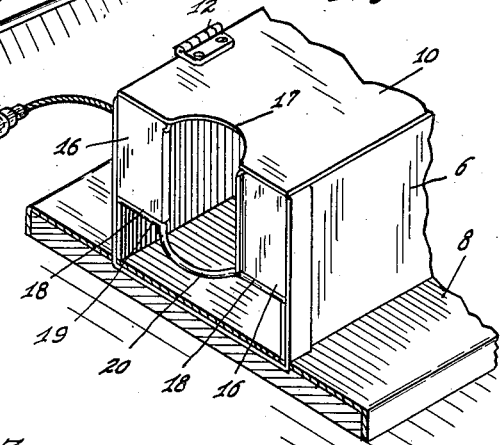
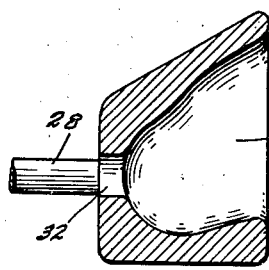
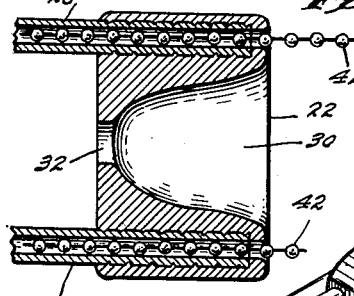
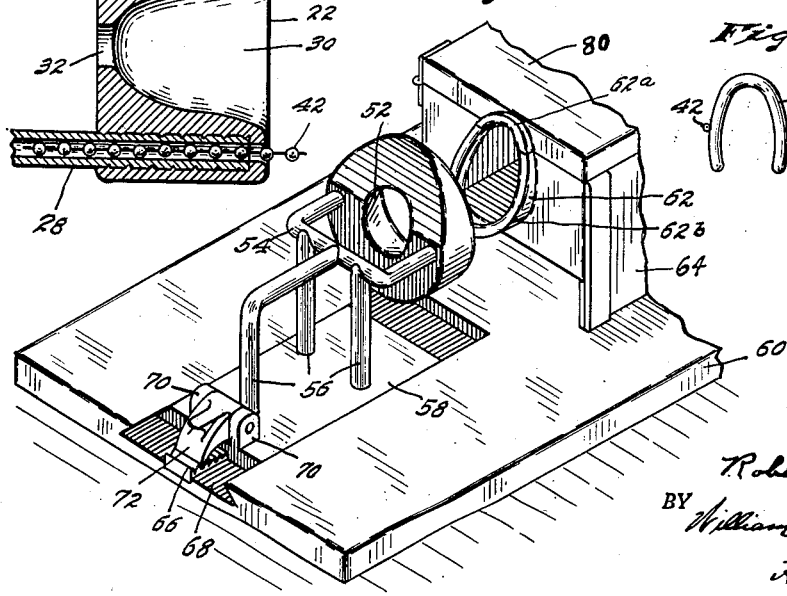
INVENTOR.
Robert E. Shipley
BY William H. Sellars
His Agent Patented Feb. 21, 1950

2,498,051

UNITED STATES PATENT OFFICE 2,498,051

ANIMAL HOLDER

Robert E. Shipley, Indianapolis, Ind., assignor to Eli Lilly and Company, Indianapolis, Ind., a corporation of Indiana Application June 28, 1946, Serial No. 680,005

5 Claims. (Cl. 119—98)

This invention relates to apparatus for holding or restraining animals while being subjected to an operation or treatment, whether curative or experimental in character.

Heretofore, devices have been constructed for holding rabbits during experimental work involving repeated injections of drugs or other substances into the veins of the animals' ears. However, these prior constructions, usually in the form of a box-like holder for confining the rabbit's body, had no provision for adequate immobilization of the rabbit's head, the result being that, upon attempting to enter a needle into an ear vein, the animal frequently caused displacement of the needle by jerking the head in various directions, either from side to side or in an up and down direction or in a rotary direction. Commonly, such displacement of the needle is accompanied by extravasation of the treating liquid and of blood into the tissues surrounding the vein at the point of injection. Repetitions of this type of accident finally cause such injury to the ear veins, by blocking thereof, as to render the rabbit unsuitable for further experimental work. Such a loss is not measured simply by the market value of the animal but, much more importantly, by the resultant interruption in what may well have been a carefully planned, co-ordinated series of the most painstaking and time-consuming operations characteristic of "in vivo" experimentation.

Accordingly, it is an object of this invention to provide an improved apparatus which will be effective in holding or restraining an animal and in immobilizing some part or member thereof selected as the site of operation or treatment, in such manner as to facilitate the operations performed upon the animal by the laboratory worker in his studies, experimental or otherwise, and to prevent accidents of the character referred to above.

To these ends, and in accordance with an important feature of the invention, there is provided a relatively rigid holder constructed to conform to the contour of some movable part or member of the animal, such as the head, which is to be directly operated upon so that such part or member may be immobilized during curative treatments or experimental work, as indicated above.

In the illustrated embodiments of the invention, provision is made for restricting bodily movements of an animal, in combination with a substantially rigid, closely fitting holding device for immobilizing the animal's head, thereby facilitating treatment or other operations directed to the head or through the head passages to other parts of the body.

Preferably, the holding device is shaped to embrace the head both in front of and behind the plane of the largest cross section thereof. As exemplified, the head-holding device comprises a mask having a chamber conforming to the shape of the anterior portion of the animal's head so that with the head snugly fitted within the chamber the former is immobilized, thus rendering it impossible for the head to be so moved as to cause displacement of an ear being subjected to experimental operations. As shown, the holding device also includes means for holding the animal's head against retraction from the mask, such means, in the illustrated constructions, comprising a collar-like member adapted to embrace the neck of the animal and to engage the head behind the ears, said mask and said collar-like member being relatively movable in directions toward and from each other to co-operate in causing introduction of the animal's head into the mask and in holding it immobilized there as long as desired. As shown, means is provided in association with the collar-like member and the mask to hold these two members releasably in such relation to each other that the head may be retained in the mask for any desired length of time.

It is to be understood that the invention and various important features thereof may have other applications and uses.

In the drawings:

Fig. 1 is a perspective view of an apparatus embodying the invention;

Fig. 2 is an enlarged view in perspective of the front end of a box forming part of the apparatus;

Fig. 3 is a vertical sectional view of a head-holding mask;

Fig. 4 is a horizontal sectional view of the mask;

Fig. 5 is a front view of a collar-like member;

Fig. 6 is an edge view of the member shown in Fig. 5; and

Fig. 7 is a perspective view of another embodiment of the invention.

In the construction of Figs. 1 to 6 inclusive, which is designed especially for holding rabbits during experimental work thereon, there is provided a box 6 secured to a support 8, the latter preferably being in the form of an elongated flat member suitable to be placed upon a bench or table at a height convenient for the laboratory worker. As shown, the box 6 is provided with a lid 10 having hinges 12 by which the lid may be movably secured to one vertical side wall of the box, thus facilitating the introduction of the animal into the box, a latch 14 being located adjacent to the opposite side wall and adapted to secure the lid in closed position to retain the animal within the box. At its front end said box 6 has a divided front wall formed by spaced wall members 16 which, together with a curved cut-out portion 17 in the front edge of the box lid 10, serves to permit the head of the rabbit to project from the box while restricting the animal's movements, it being understood in this connection that, upon attempt of the rabbit to escape at the front end of the box, the divided wall members 16 engage the shoulder portions of the rabbit sufficiently to retain the animal within the box chamber.

The wall members 16 may be cut away in their lower portions to accommodate the forelegs of the rabbit, the lower edge portions of said wall members 16 serving as flanges 18 to prevent the rabbit's legs from being lifted to the area adjacent to the ears. Preferably and as shown, a rod member 19 is secured to the lower edge portions of the wall members 16 to reinforce the same and to provide a forwardly bowed element 20 serving to restrict additionally the movements of the rabbit and having other uses to be pointed out later.

Mounted rigidly upon the support 8, and in alignment with the space between the wall members 16, is a head-holding member or mask 22 carried fixedly by a bracket 24 rigidly secured by posts 26 to the support 8. As shown, the bracket 24 is provided with two arms 28 in the form of tubular members which extend through the wall portions of the mask 22 for a purpose which will hereinafter be described. The mask 22 is provided with a chamber 30 shaped to conform to and fit closely to the fore part of a head of a rabbit of the size normally used in laboratory work (usually weighing about 2.5 kg.).

In order to secure the desired close-fitting relationship between the shape of the chamber and the shape of the rabbit's head, the latter may be molded in plaster of Paris to serve as a core about which a thermosetting plastic may be molded to provide a mask with the desired chamber therein suitable to engage snugly the forepart of the rabbit's head. Obviously, metallic material may be molded or stamped to provide a head-holding member having a chamber with an internal surface which conforms to the shape of a selected portion of the fore part of the rabbit's head. It will readily be understood that a rabbit's head of smaller dimensions should be entered farther into the chamber to secure such positioning thereof as to prevent undesirable movement of the head while it is undergoing operation or treatment. As shown, the mask 22 is supported so that the chamber therein is slightly tilted downward and away from the box 6 and is therefore only approximately horizontal in its long axis, so that the fore part of the rabbit's head may readily be introduced into said chamber without imposing undue strain on the neck portions of the animal. Preferably and as shown, the chamber 30 at its far end from the box 6 is provided with an opening 32 to serve as a breathing orifice for the imprisoned animal. It will be observed that the various vertical dimensions of the chamber 30 throughout a considerable portion of its length are greater than the corresponding transverse dimensions thereof in conformity with the shape of the rabbit's head, the dimensions of the chamber and its inclination serving the useful purpose of preventing the rabbit from moving the head in a rotary direction as well as preventing side to side and/or up and down movements.

Means is provided for drawing the rabbit's head into close-fitting relationship to the chamber in the mask 22 and for holding it there. This means comprises a device having a part adapted to engage the rabbit's head back of the ears. It may take the form of an inverted U-shaped member 40 adapted to be slipped over the neck of the rabbit just back of the head so that, upon traction applied to the said collar, the rabbit's head may be forced into the chamber 30 without injury to the animal. In the construction shown, chains 42 are secured to the collar 40 and are threaded through the tubular members 28 and joined at their front ends to make a continuous chain member as shown in Fig. 1. Upon applying traction to the chains 42, the collar 40 is operated in the manner described above to draw the rabbit's head into the chamber and to hold it there. A releasable locking means for the chains 42 is conveniently provided by making the chains of the ball type and providing slits at the front end of the tubular members 28 into which a link portion of each of the chains may be engaged to prevent retraction of the rabbit's head, it being understood that the chains may be readily released from said slits when it is desired to permit the rabbit to retract his head from the mask 22. While applying the collar member 40 to the rabbit's neck, portions of the chain members 42 adjacent to the member 40 rest upon the bowed element 20 at the front end of the box 6 and thus are prevented from getting under the reinforced flanges 18 and from getting tangled with the rabbit's forelegs.

With the body of the animal restricted as to bodily movements by the box 6, and more particularly against movement in a forward direction by the divided front wall 16 of said box and by the bowed element 20, complete immobilization of the rabbit's head is effected through the co-operation of the collar 40 and the mask 22. As described above, relative movement between these two, that is, between the collar and the mask, is effective to introduce the fore part of the rabbit's head into the mask chamber and to hold it there as long as desired. Since the rabbit cannot move its head and since further the ear muscles are relatively weak, it follows that the ear may be easily held while the needle is being introduced into a blood vessel in the ear. Since there is no possibility of the needle's being displaced by any action of the rabbit, experimental operations are facilitated to a very substantial extent and the danger of any displacement of the needle reduced to a minimum.

If desired, an electric light bulb 50 may be attached to the supporting board 8 (or may be otherwise disposed) in position below either ear, thus transilluminating the rabbit's ear from below and thereby particularly locating and visualizing the smaller veins. With this arrangement, it is rarely necessary to clip or shave the hair over the vein in preparing for injection.

In that exemplification of the invention shown in Fig. 7, a mask 52 somewhat similar to the mask 22 is mounted upon a bracket 54 carried by posts 56 fixed to a member 58 slidably mounted in a base member 60. Preferably, and as shown, the member 58 is dovetailed into a slideway in such manner that there is substantially no lost motion in a direction transversely of the member 58. For the purpose of holding the slide member 58 and the mask 52 carried thereby in desired relation to a collar member 62 carried by a box 64, there is conveniently provided a rack member 66 either integral with or fixedly secured to the box supporting base member 60, the said rack member 66 being arranged to extend upward from the floor 68 of the slideway and being receivable in a groove in the lower face of the slide member 58. Pivotally mounted upon a bracket 70 extending upward from the slide member 58 is a pawl 72 adapted to run over teeth of the rack member 66 while the slide member 58 is being moved toward the box 64 and to engage selectively a vertical surface on one of the teeth upon any attempt to move the slide member 58 away from the box 64. In other words, the pawl 72 constitutes an automatic locking means for holding the mask 52 in its operative position, it being understood that the mask 52 may be readily released and moved away from the box simply by lifting the pawl 72 from engagement with the rack 66.

As indicated above, the mask 52 is not identical in its construction with the mask 22, this being evident upon comparison of the showing in Fig. 7 with that of Figs. 1, 3 and 4, the mask 22 being of a size and shape to engage and cover all of the fore part of the rabbit's head, whereas the mask 52 is cut away so that the front ends of the upper and lower jaws of the rabbit are exposed, thus making it possible, for example, to introduce a stomach tube through the rabbit's mouth. Otherwise, the mask 52 is quite similar to the mask 22, and particularly in the fact that it conforms to the shape of the engaged portion of the rabbit's head since it has a chamber of the same vertical and transverse dimensions as the larger half of the chamber shown in Figs. 3 and 4.

Whereas the collar member 40 is movable toward and from the stationary mask 22 (Fig. 1), the mask 52 in Fig. 7 is movable toward and from a stationary collar 62 carried by the box 64. As shown, the collar 62 is a divided member having an upper part 62a rigidly secured to a cover member or lid 80 of the box 64, said lid being pivoted to the box 64 and being releasably secured in place by means of hinges and a latch member similar to those disclosed in relation to the cover 10 on the box 6 of Fig. 1. When the lid 80 is in closed position, the collar member 62a is in co-operative relation with respect to a lower member 62b of the collar 62, it being understood in this connection that a rabbit is placed in the box 64 while the lid 80 is in raised position so that the neck of the rabbit may be introduced from above into the opening surrounded by the collar member 62b, movement of the lid 80 to closed position having the effect of securely restricting bodily movements of the rabbit by encircling his neck back of the head through co-operation of the collar members 62a and 62b. It will be noted that the collar member 62b is so constructed as to have a progressively greater thickness dimension in the lower portions thereof so that said lower portions engage the lower jaw portions of the rabbit at the back thereof, thus positively preventing movement of the head about a horizontal axis in the neck and thus further limiting any attempted retraction of the rabbit's head into the box while the mask member 52 is being moved upon the fore part of the head and finally into a position where the chamber therein is snugly fitted to a fore part of the rabbit's head while exposing the nose and the fore parts of the upper and lower jaws of the rabbit. While this embodiment of the invention shown in Fig. 7 is intended to expose a substantial portion of the mouth of the animal for purposes indicated above, it is to be understood that the mask 52 when in co-operative relation to the collar 62 is fully as effective as mask 22 and collar 40 in immobilizing the rabbit's head for experimental operations in connection with the blood vessels of the ear.

I claim:

1. In an apparatus of the class described, the combination of a member for restricting bodily movements of an animal, said member comprising means to prevent the animal's legs from reaching the area about the ears, a support for said member, a mask associated with said member and having a chamber shaped to receive the fore part of the animal's head, a supporting member for said mask, a collar-like member adapted to engage the animal's head back of the ears, chain-like members connected to the collar member for exerting traction on the latter to draw the fore part of the animal's head into said chamber, and a bracket stationary with respect to said mask, said chain-like members being releasably connectable to said bracket so that the animal's head may be held releasably in engagement with said mask.

2. In an apparatus of the class described, a member for restricting bodily movements of a rabbit, said member comprising flanges operative to prevent the rabbit's legs from reaching the area about the ears, a support for said member, a mask having a chamber therein to receive the fore part of the rabbit's head, a bracket fastened to said support and serving to support the mask in spaced relation to said member, tubular members rigidly connected to said bracket, a collar member adapted to embrace the rabbit's neck and to engage the head behind the ears, and chain members connected to the collar member and passing through said tubular members and adapted to be moved lengthwise of said tubular members to exert traction upon the collar member whereby the fore part of the rabbit's head may be drawn into the chamber in the mask, said chain members being engageable with the front ends of the tubular members to releasably hold the collar member in its adjusted position with respect to the mask, whereby the rabbit's head may be held immobilized in engaging position with said mask as long as may be desired.

3. In an apparatus of the class described, a box member for receiving the body of a rabbit and restraining it against undesired movement, said box having an opening for encircling the rabbit's neck, a support for said box, a bracket secured to said support, a mask secured to the bracket and having a chamber shaped to conform to the fore part of the rabbit's head, a collar-like member for engaging the rabbit's head back of the ears, tubular members rigidly carried by said bracket, and chain members secured to said collar member and passed lengthwise through said tubular members, the arrangement being such that upon traction upon said chain members the rabbit's head is drawn into the chamber and immobilized therein, said chain members being engageable with the tubular members to releasably hold the rabbit's head in position in the mask as long as may be desired.

4. In an apparatus of the class described, in combination, a member for restricting bodily movements of a rabbit, said member comprising means to prevent the rabbit's legs from reaching the area about the ears, a support for said member, a relatively rigid mask the interior surface of which is shaped to conform to a forepart of the rabbit's head, a supporting member supporting said mask, a collar-like member adapted to embrace the rabbit's neck and to engage the head behind the ears, and means for causing relative movement of the mask and the collar-like member toward and away from each other along the longitudinal axis of the rabbit's body whereby the rabbit's head may be brought into engagement with and immobilized by the co-operation of said mask and said collar-like member, and locking means for releasably holding said mask and said collar-like member in head-immobilizing position.

5. In a rabbit-holder, the combination of a member for restricting bodily movements of the rabbit, said member comprising means to prevent the rabbit's legs from reaching the area about the ears, a support for said member, a collar-like member supported by said body-movement restrictive member adapted to embrace the rabbit's neck and to engage the head behind the ears, a relatively rigid mask the interior of which is shaped to conform to a forepart of the rabbit's head, a supporting member for said mask, means for moving said mask toward and away from said collar-like member along the longitudinal axis of the rabbit's body whereby the rabbit's head may be brought into engagement with and immobilized by the co-operation of said mask and said collar-like member, and locking means for releasably holding said mask in head-immobilizing position.

ROBERT E. SHIPLEY.

REFERENCES CITED

The following references are of record in the file of this patent:

UNITED STATES PATENTS

| Number | Name | Date |
| --- | --- | --- |
| 266,016 | Cook | Oct. 17, 1882 |
| 673,948 | Gollyer | May 14, 1901 |
| 1,215,884 | Smith et al. | Feb. 13, 1917 |
| 1,487,977 | Ryan | Mar. 25, 1924 |
| 1,760,017 | Smoot | May 27, 1930 |
| 1,788,924 | Marrinan et al. | Jan. 13, 1931 |
| 1,956,499 | Dworetzky | Apr. 24, 1934 |